(12) United States Patent
Kang et al.

(10) Patent No.: US 9,461,447 B2
(45) Date of Patent: Oct. 4, 2016

(54) MAINTENANCE TOOL FOR INSULATOR OF DIRECT CURRENT TRANSMISSION LINE

(75) Inventors: Shufeng Kang, Hebei (CN); Mingxu Zhang, Hebei (CN); Fengxiang Shi, Hebei (CN); Xuebin Wang, Hebei (CN); Juxuan Jiao, Hebei (CN); Zhi Gao, Hebei (CN); Zhongsheng Li, Hebei (CN); Sanping Geng, Hebei (CN); Yongjie Su, Hebei (CN); Jian Li, Hebei (CN); Jun Wang, Hebei (CN); Boyan Yao, Hebei (CN); Ming Chen, Hebei (CN); Qifeng Song, Hebei (CN)

(73) Assignees: State Grid Corporation of China, Beijing (CN); Hebei Electric Power Maintenance Company, Shijiazhuang, Hebei, Chinga ( * ) Notice: Subject to any disclaimer, the term of this patent is extended or adjusted under 35 U.S.C. 154(b) by 650 days.

(21) Appl. No.: 13/976,961

(22) PCT Filed: Nov. 29, 2011

(86) PCT No.: PCT/CN2011/083179
§ 371 (c)(1),
(2), (4) Date: Jun. 27, 2013

(87) PCT Pub. No.: WO2012/088987
PCT Pub. Date: Jul. 5, 2012

(65) Prior Publication Data
US 2013/0269180 A1    Oct. 17, 2013

(30) Foreign Application Priority Data

Dec. 28, 2010  (CN) .......................... 201020685182

(51) Int. Cl.
| | | |
|---|---|---|
| B23P 19/00 | (2006.01) | |
| H02G 1/02 | (2006.01) | |
| H02G 1/04 | (2006.01) | |

(52) U.S. Cl.
CPC ............... *H02G 1/02* (2013.01); *H02G 1/04* (2013.01); *Y10T 29/53283* (2015.01)

(58) Field of Classification Search
CPC ..... H02G 1/02; H02G 1/04; Y10T 29/53283
USPC .............. 29/764, 762, 700; 254/134.3 R, 254/134.3 PA; 174/40 R, 45 TD
See application file for complete search history.

(56) References Cited

FOREIGN PATENT DOCUMENTS

| CN | 2552142 Y | * | 5/2003 |
|---|---|---|---|
| CN | 201126942 Y | | 10/2008 |

(Continued)

OTHER PUBLICATIONS

International Search Report and Written Opinion (in Chinese language) issued by the State Intellectual Property Office of the P.R. China, dated Feb. 12, 2012, for related International Application No. PCT/CN2011/083179; 14 pages.

(Continued)

*Primary Examiner* — Peter DungBa Vo
*Assistant Examiner* — Azm Parvez
(74) *Attorney, Agent, or Firm* — Faegre Baker Daniels LLP

(57) ABSTRACT

A maintenance tool for an insulator of a direct current transmission line comprises clamping devices and a tensioning device. The clamping devices are mounted at the two sides of the insulator through clamping, and the tensioning device is connected between the clamping devices. The clamping devices comprise a closed clamp (1), a single serial clamping device (2) and a wire end clamping device (30). The clamping device has advantages such as strong overall strength and bearing capacity, small size, light weight, and reliable working, and can be applied to replacement of various insulators on the direct current transmission line, reliably ensuring safe commissioning and regular maintenance of transmission lines.

8 Claims, 4 Drawing Sheets

(56) References Cited

FOREIGN PATENT DOCUMENTS

| | | | |
|---|---|---|---|
| CN | 201126943 Y | * | 10/2008 |
| CN | 201126944 Y | * | 10/2008 |
| CN | 201332232 Y | * | 10/2009 |
| CN | 201509027 U | | 6/2010 |
| CN | 102136695 A | | 7/2011 |
| CN | 202014054 U | | 10/2011 |
| JP | 2004171946 A | | 6/2004 |

OTHER PUBLICATIONS

English translation of the International Search Report issued by the State Intellectual Property Office of the P.R. China, dated Feb. 12, 2012, for related International Application No. PCT/CN2011/083179; 3 pages.

* cited by examiner

MAINTENANCE TOOL FOR INSULATOR OF DIRECT CURRENT TRANSMISSION LINE

This application is the national phase of International Application No. PCT/CN2011/083179, titled "MAINTENANCE TOOL FOR INSULATOR OF DIRECT CURRENT TRANSMISSION LINE", filed on Nov. 29,2011, which claims priority to Chinese patent application No. 201020685182.8 titled "MAINTENANCE TOOL FOR INSULATOR OF DIRECT CURRENT TRANSMISSION LINE" and filed with State Intellectual Property Office of PRC on Dec. 28, 2010, the entirety of which are incorporated herein by reference in its entirety.

FIELD OF THE INVENTION

The present application relates to the field of the electric power, and particularly to a maintenance tool for an insulator on a direct current transmission line.

BACKGROUND OF THE INVENTION

As the power grid construction of China is improved increasingly, the extra high voltage transmission line becomes the backbone of the power grid frame of China, which also has a higher requirement on the maintenance work. Especially as the 660 kV grade of direct current transmission line is firstly applied in China, in order to ensure the normal operation of the transmission line and that troubles found during the operation of the transmission line can be solved timely, to thereby ensure the safe operation of the direct current transmission line, it is necessary to develop a set of tools for the maintenance of the transmission line in operation.

One of the primary contents of the maintenance work of the transmission line is to repair and replace an insulator. Most high voltage transmission lines are supported on a crossarm via an insulator which plays a fundamental role of supporting the wire and preventing the current from returning to the ground in the aerial transmission lines. The 660 kV grade of direct current transmission line, compared with the extra high voltage and ultrahigh voltage transmission lines in operation currently, employs a different material, for example, the wire is the aluminum conductor steel reinforced of 4×JL/G3A-1000/45 mm$^2$, and the distance between the electrodes of the wire is 18 m. The linear insulator is a V-type composite insulator which has a length of 8.5 m in the light polluted area and 9.2 m in the heavy polluted area. And the tension insulator string is a 550 kN double porcelain insulators in parallel. Influenced by the length of the string of the insulators and the electric clearance, the tower head for carrying the insulators and the transmission lines has a large size, and affected by the project, the vertical load of the lines increases accordingly, which causes the change of the tension, the length and the like, thereby has a higher requirement on the replacement of the insulator in aspects such as the tension and the length. At present, maintenance tools for the transmission line at a voltage grade below 500 kV have been more perfect, however, due to the increase of the voltage grade, the diameter of the transmission line and the length of the insulator string are increased. Thus the maintenance tools have been far from the requirements for the replacement.

SUMMARY OF THE INVENTION

It is provided according to one technical problem to be solved by the present application a maintenance tool for an insulator on a direct current transmission line.

In view of this, the present application adopts the following technical solutions.

A maintenance tool for an insulator on a direct current transmission line including a clamping device configured to be clamped at two ends of the insulator and a tension device configured to be connected between the clamping device. The clamping device includes: a closed clamp configured to be clamped on the insulator, a single string clamp fixed on a towing plate, and a wire end clamp fixed on a wire end yoke plate. The tension device is a mechanical transmission screw rod. When replacing a first insulator at a crossarm end, a cooperation of the single string clamp, the closed clamp and the tension device is used. When replacing a first insulator at a wire end, a cooperation of the wire end clamp, the closed clamp and the tension device is used. When replacing a single insulator or multiple insulators in the middle portion, or a long rod insulator, two closed clamps and two tension devices are sufficient for the replacing of the insulator.

The structure of the closed clamp is that: the closed clamp includes a closed clamp main body and an upper cover arranged on the closed clamp main body. One end of the upper cover is moveably connected to the closed clamp main body via a pin shaft, and the other end of the upper cover is fixedly connected to the closed clamp main body via a bolt. A through hole for receiving the insulator is formed between the closed clamp main body and the upper cover. Each of two end portions of the main body is provided with a pin hole for connecting the tension device; and an inner side of the pin hole is provided with a lifting device for lifting the insulator.

The improvements of the closed clamp lie in that: the lifting device is a support fixed on the closed clamp main body, and the support is provided with a pulley wheel for hanging a cable; the lifting device is configured for lifting a heavy long rod insulator in replacing the long bar insulator.

The structure of the single string clamp is that: the single string clamp includes a single string clamp main body. A wing plate is arranged on each of two sides of the single string clamp main body, and an end portion of the wing plate is provided with a pin hole for connecting the tension device. A lower portion of the main body is fixedly connected with an insert plate having a clamping groove, and a lower end portion of the insert plate is provided, at a position corresponded to that of a connecting hole on the towing plate, with a pin hole.

The structure of the wire end clamp is that: the wire end clamp includes a wire end clamp main body and a plate turning clamp arranged on the wire end clamp main body. One end of the plate turning clamp is movably connected with the wire end clamp main body via a pin shaft, and the other end of the plate turning clamp is fixedly connected with the wire end clamp main body via a bolt. A through hole for receiving a wire end yoke plate is formed between the wire end clamp main body and the plate turning clamp. Each of the wire end clamp main body and the plate turning clamp is provided with a hole corresponded to a nut on the wire end yoke plate. Each of two end portions of the wire end clamp main body is movably connected with a steel connector for connecting the tension device.

The improvement of the tension device is that: the tension device includes a mechanical transmission screw rod and a hydraulic device connected to one end of the mechanical transmission screw rod via a locating pin or an insulation pulling rod.

With the above technical solutions, the present application has the following technical progresses.

Based on characters of the direct current transmission line such as the tower-shaped structure, the hanging manner of the insulator string and parameters of the earth wire, the present application provides a maintenance tool for live or power outage maintaining of the long rod insulator, a single porcelain insulator or multiple porcelain insulators on a 660 kV direct current transmission line. The maintenance tool has advantages such as a proper structure, a high overall strength, a small volume, a light weight and a reliable operation, thereby providing a reliable guarantee for the safe commissioning as well as the routine maintenance after the commissioning of the 660 kV direct current transmission line.

The arrangement of the lifting device on the closed clamp enables the operator to lift a heavy long rod insulator during the replacing operation of the long rod insulator, which reduces the labor intensity and increases the working efficiency of the operator.

The tension device is configured to be a composition of the mechanical transmission screw rod and the hydraulic device for shortening or enlarging idle strokes of the clamps, which overcomes the disadvantages that the hydraulic transmission system has a slow transmission speed when being used for transmitting a large mechanical load, and reduces the working time of the operator when working high above the ground. Besides, the structure has a function of mutual protection, that is, when one of the transmission mechanisms fails, the normal work of the other transmission mechanism would not be influenced, thereby the operation reliability is greatly improved. Further, since the tension device is assembled from separate structures, when the tension device is in idle, the separate structures may be stored separately, thereby facilitating the replacement and the maintenance.

Figure 1:
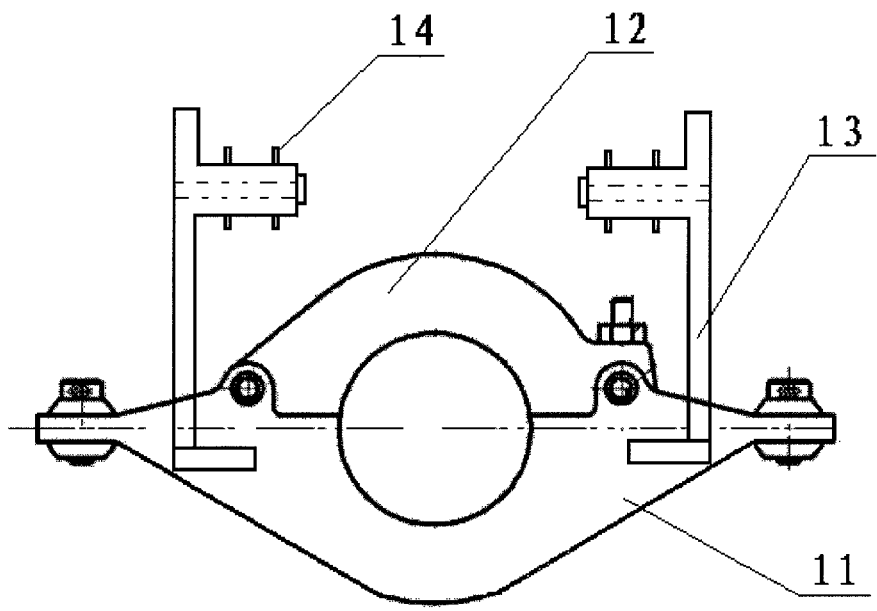
FIG. 1 is a front view of a closed clamp.

REFERENCE NUMBERS IN THE FIGURES 1. closed clamp, 11. closed clamp main body, 12. upper cover, 13. support, 14. pulley wheel, 2. single string clamp, 21. single string clamp main body, 22. wing plate, 23. clamping groove, 24. insert plate, 3. wire end clamp, 31. wire end clamp main body, 32. plate turning clamp, 33. steel connector, 4. mechanical transmission screw rod, 5. hydraulic device, and 6. insulation pulling rod.

DETAILED DESCRIPTION

The present application will be illustrated in detail hereinafter in conjunction with the accompanying drawings and the embodiments.

A maintenance tool for an insulator on a direct current transmission line includes a clamping device configured to be clamped at two sides of the insulator and a tension device connected between the clamping device. The clamping device includes a closed clamp 1, a single string clamp 2 and a wire end clamp 3. The clamping device is made of a TC4 titanium alloy material, and has characters including a high strength, a good plasticity, a light weight, a small volume, a high load bearing capacity and facilitates working high above the ground.

Figure 2:
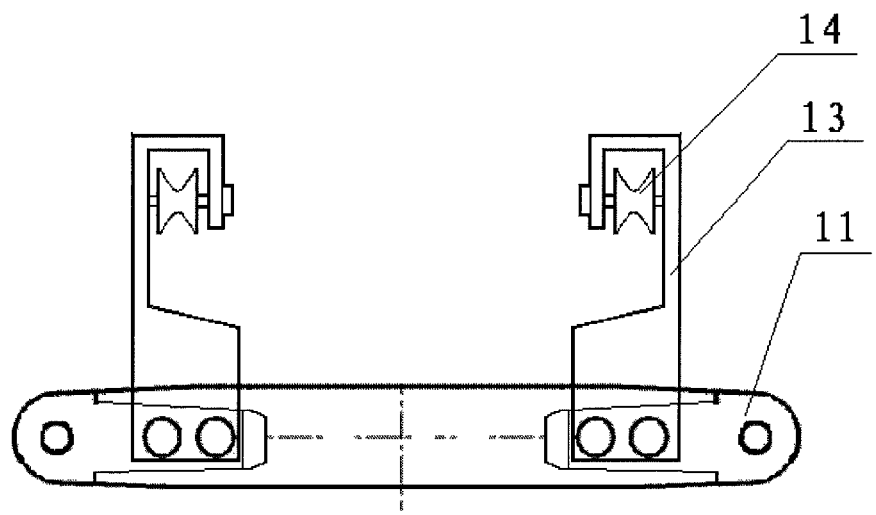
FIG. 2 is a top view of a closed clamp.

The closed clamp is clamped on a steel cover of the insulator, the structure of which is shown in FIG. 1 and FIG. 2. The closed clamp includes a closed clamp main body 11 and an upper cover 12 arranged on the closed clamp main body. One end of the upper cover is movably connected with the closed clamp main body via a pin shaft, and the other end of the upper cover is fixedly connected with the closed clamp main body via a bolt. A through hole for receiving the insulator is formed between the closed clamp main body and the upper cover. Each of two end portions of the main body is provided with a pin hole for connecting the tension device, and an inner side of the pin hole is provided with a lifting device for lifting the insulator. The lifting device is configured as a support 13 fixed on the closed clamp main body, and a pulley wheel 14 for hanging a cable is provided on the support.

Figure 3:
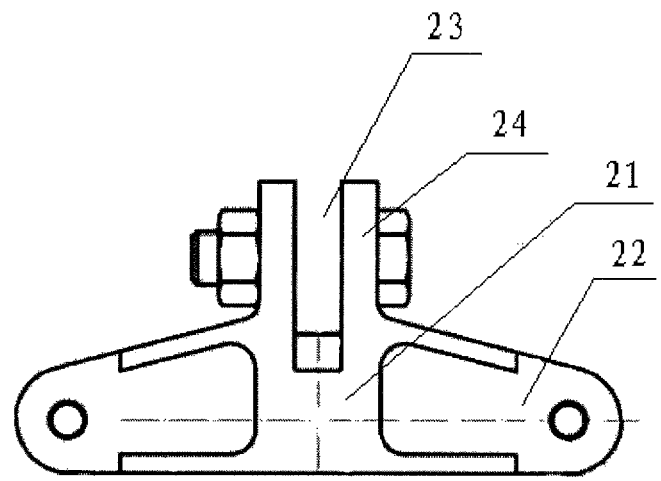
FIG. 3 is a front view of a single string clamp.

The single string clamp is fixedly connected on a towing plate, the structure of which is shown in FIG. 3. The single string clamp includes a single string clamp main body 21, a wing plate 22 and an insert plate 24. The wing plate 22 is provided at each of two sides of the single string clamp main body 21, and an end portion of the wing plate is provided with a pin hole for connecting the tension device. The insert plate 24 is fixedly connected at a lower portion of the single string clamp main body 21, a lower portion of the insert plate 24 is formed with a clamping groove 23, and a lower end portion of the insert plate is provided, at a position corresponded to that of a connecting hole on the towing plate, with a pin hole.

Figure 4:
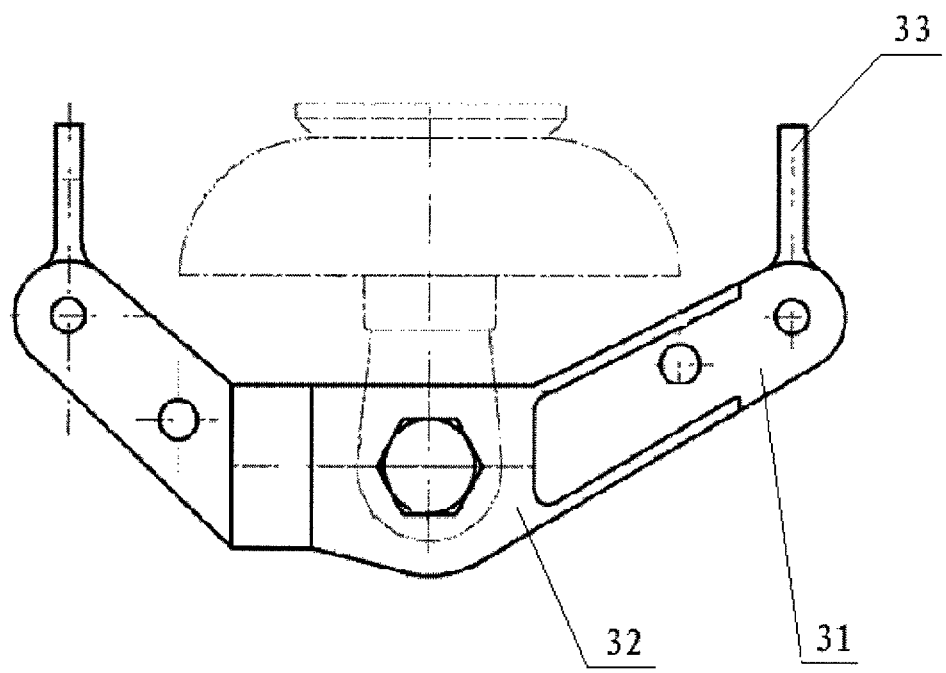
FIG. 4 is a schematic structural view of a wire end clamp.
Figure 5:
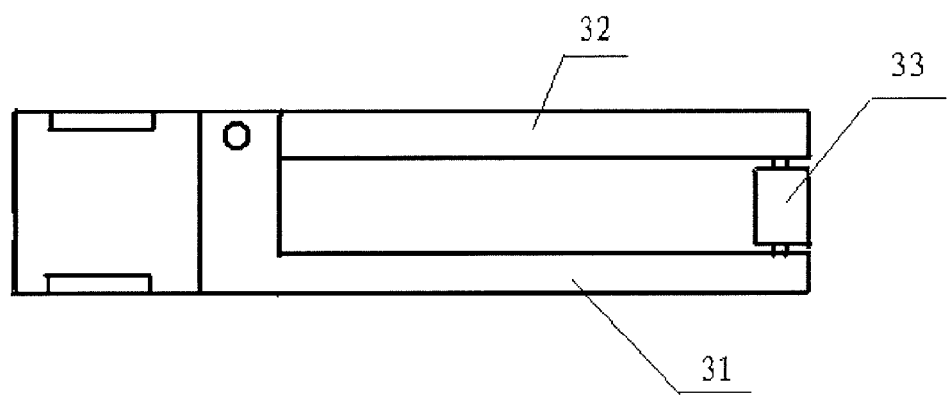
FIG. 5 is a bottom view of FIG. 4.

The wire end clamp is fixed on a wire end yoke plate, as shown in FIG. 4 and FIG. 5. The wire end clamp includes a wire end clamp main body 31 and a plate turning clamp 32. The plate turning clamp 32 is arranged on the wire end clamp main body, one end of the plate turning clamp is movably connected with the wire end clamp main body 31 via a pin shaft, and the other end of the plate turning clamp is fixedly connected with the wire end clamp main body via a bolt. A through hole for receiving a wire end yoke plate is formed between the wire end clamp main body and the plate turning clamp. Each of the wire end clamp main body 31 and the plate turning clamp 32 is provided with a hole corresponded to a nut on the wire end yoke plate. Each of two end portions of the wire end clamp main body 31 is movably connected with a steel connector 33 for connecting the tension device.

The tension device is connected between the closed clamp and the wire end clamp or between the closed clamp and the single string clamp, and the tension device is a combination of a mechanical transmission screw rod 4 and a hydraulic device 5. The mechanical transmission screw rod is connected to the hydraulic device via an insulation pulling rod 6.

First Embodiment

Figure 6:
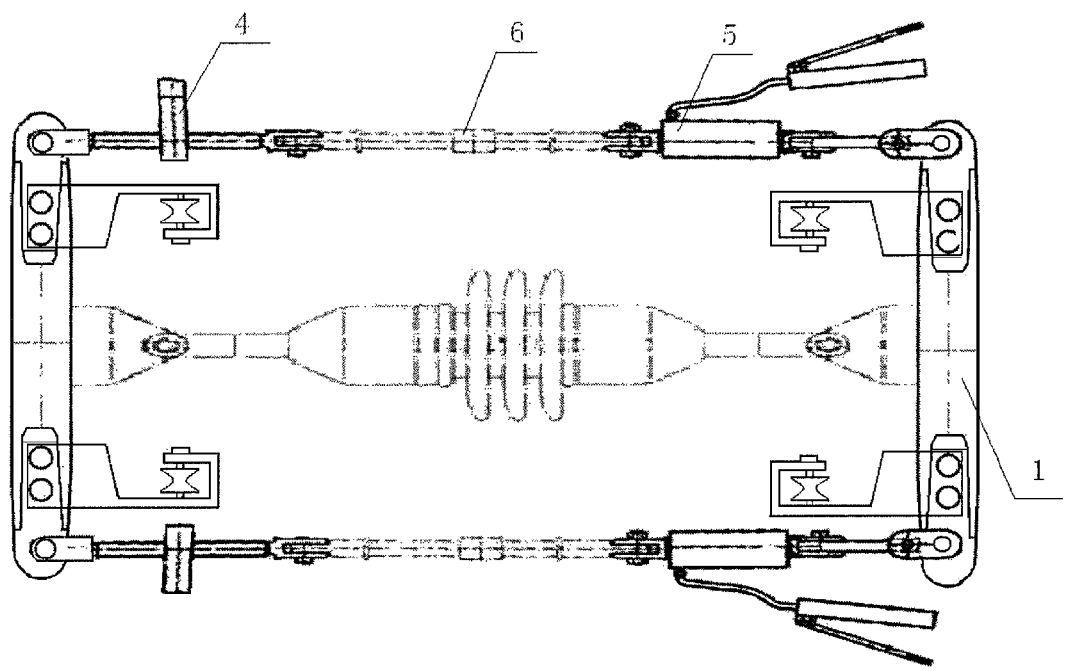
FIG. 6 is a connecting relationship diagram for replacing a long rod insulator according to the present application.

In a case that the present application is use for replacing a single insulator, multiple insulators in the middle portion or a long rod insulator on a 660 kV direct current transmission line, two closed clamps and two tension devices are sufficient, as shown in FIG. 6. The upper cover of the closed clamp is opened, and is rotated to one side of the closed clamp main body about a pin shaft. Then the closed clamp is clamped on a steel cover at one of two ends of the insulator, and then the upper cover is covered to its original position. Then the upper cover and the closed clamp main body is fixedly connected via a bolt, thereby the closed clamp is fixedly connected on the insulator. Then the mechanical transmission screw rods and the hydraulic devices of the two tension devices are respectively connected to pin holes at ends of the two closed clamps, and then the insulation pulling rod 6 is connected between the mechanical transmission screw rod and the hydraulic device, so as to tension the insulator in the case that the insulator is long.

After the connecting operation, the screw rod is tightened or the hydraulic device is actuated to thereby tension the closed clamps, such that the insulator is relaxed and no tension is applied thereon, and thus the insulator may be replaced. The lifting device on the closed clamp may be used to lift the insulator in cases that the insulator is heavy, which can save the labor resource and improve the safety of the operation.

Second Embodiment

Figure 7:
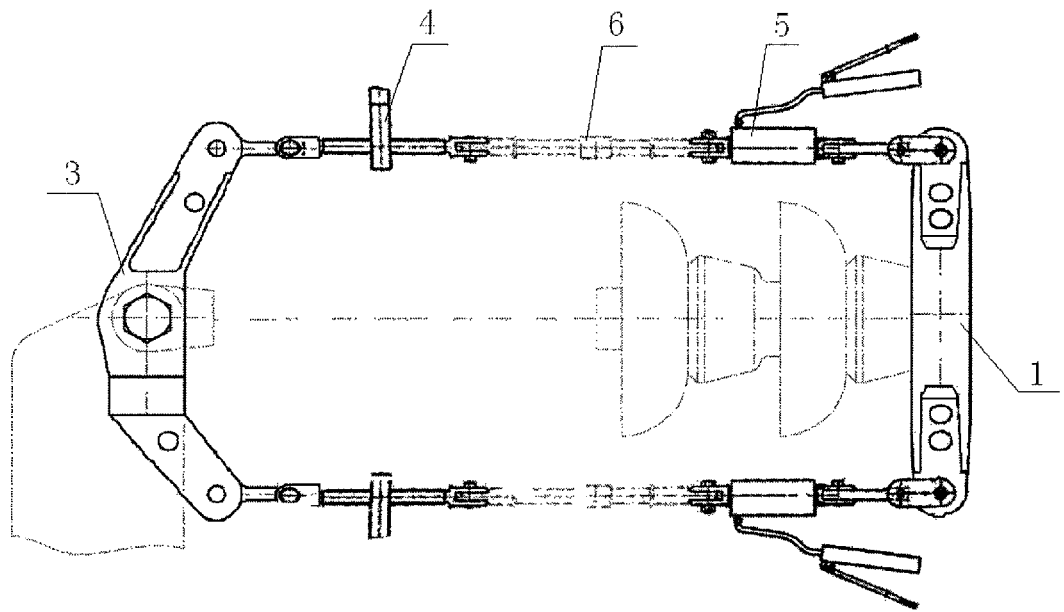
FIG. 7 is a connecting relationship diagram for replacing a first insulator at a wire end according to the present application.

When replacing a first insulator at a wire end on a 660 kV direct current transmission line, a composition of the wire end clamp, the closed clamp and the tension device is used, as shown in FIG. 7. The difference between the second embodiment and the first embodiment lie in that: one closed clamp is clamped on the steel cover of the first insulator at the wire end; then the plate turning clamp of the wire end clamp is rotated to one side of the wire end clamp main body about a pin shaft such that the wire end yoke plate is clamped between the wire end clamp main body and the plate turning clamp, then the nut on the wire end yoke plate is inserted into the bolt hole of the wire end clamp; and then the other end of the plate turning clamp is fixedly connected with the wire end clamp main body via a bolt; next the mechanical transmission screw rod and the hydraulic device of the tension device is connected between the closed clamp and the wire end clamp, and the insulation pulling rod is connected between the mechanical transmission screw rod and the hydraulic device, thereby the insulator can be tensioned in a case that the insulator is long.

In cases that the first insulator is near to the wire end yoke plate, the tension device may only includes the mechanical transmission screw rod or the hydraulic device.

Third Embodiment

Figure 8:
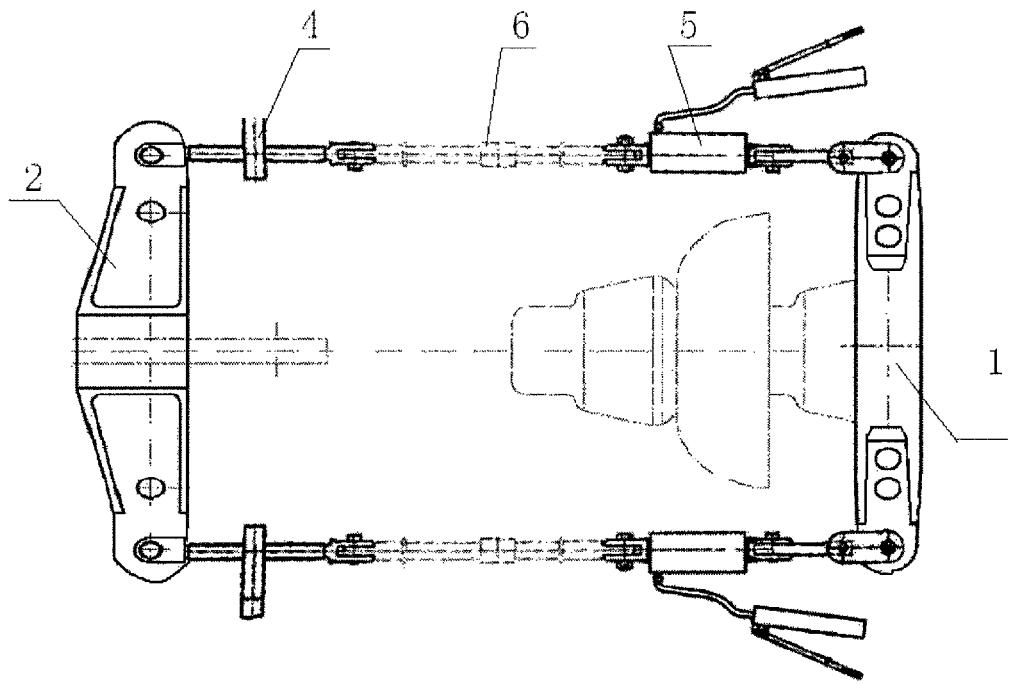
FIG. 8 is a connecting relationship diagram for replacing a first insulator at a crossarm end according to the present application.

When replacing a first insulator at a crossarm end on a 660 kV direct current transmission line, a composition of the single string clamp, the closed clamp and the tension device is used, as shown in FIG. 8. The difference between the third embodiment and the second embodiment lie in that, one closed clamp is mounted on the steel cover of the first insulator at the crossarm end; then the insert plate, having the clamping groove, of the single string clamp is mounted on the towing plate such that the connecting hole on the towing plate is aligned with the pin hole of the single string clamp, then a bolt is passed through the holes such that the single string clamp is fixedly connected with the towing plate.

What is claimed is:

1. A maintenance tool for an insulator on a direct current transmission line, comprising a clamping device configured to be clamped at two ends of the insulator and a tension device configured to be connected between the clamping device, wherein the clamping device comprises a closed clamp configured to be clamped on the insulator, a single string clamp fixed on a towing plate, and a wire end clamp fixed on a wire end yoke plate; and the tension device is a mechanical transmission screw rod; and wherein the wire end clamp comprises a wire end clamp main body and a plate turning clamp arranged on the wire end clamp main body, and wherein one end of the plate turning clamp is movably connected with the wire end clamp main body via a pin shaft, and the other end of the plate turning clamp is fixedly connected with the wire end clamp main body via a bolt; a through hole for receiving a wire end yoke plate is formed between the wire end clamp main body and the plate turning clamp; each of the wire end clamp main body and the plate turning clamp is provided with a hole corresponded to a nut on the wire end yoke plate; and each of two end portions of the wire end clamp main body is movably connected with a steel connector for connecting the tension device.

2. The maintenance tool for the insulator on the direct current transmission line according to claim 1, wherein the closed clamp comprises a closed clamp main body and an upper cover arranged on the closed clamp main body, and wherein one end of the upper cover is moveably connected to the closed clamp main body via a pin shaft, and the other end of the upper cover is fixedly connected to the closed clamp main body via a bolt; a through hole for receiving the insulator is formed between the closed clamp main body and the upper cover; and each of two end portions of the main body is provided with a pin hole for connecting the tension device, and an inner side of the pin hole is provided with a lifting device for lifting the insulator.

3. The maintenance tool for the insulator on the direct current transmission line according to claim 2, wherein the lifting device is a support fixed on the closed clamp main body, and the support is provided with a pulley wheel for hanging a cable.

4. The maintenance tool for the insulator on the direct current transmission line according to claim 1, wherein the single string clamp comprises a single string clamp main body; a wing plate is arranged on each of two sides of the single string clamp main body, an end portion of the wing plate is provided with a pin hole for connecting the tension device; a lower portion of the main body is fixedly connected with an insert plate having a clamping groove, and a lower end portion of the insert plate is provided, at a position corresponded to that of a connecting hole on the towing plate, with a pin hole.

5. The maintenance tool for the insulator on the direct current transmission line according to claim 1, wherein the tension device includes the mechanical transmission screw rod and a hydraulic device connected to one end of the mechanical transmission screw rod.

6. The maintenance tool for the insulator on the direct current transmission line according to claim 2, wherein the tension device includes the mechanical transmission screw rod and a hydraulic device connected to one end of the mechanical transmission screw rod.

7. The maintenance tool for the insulator on the direct current transmission line according to claim 3, wherein the tension device includes the mechanical transmission screw rod and a hydraulic device connected to one end of the mechanical transmission screw rod.

8. The maintenance tool for the insulator on the direct current transmission line according to claim 4, wherein the tension device includes a mechanical transmission screw rod and a hydraulic device connected to one end of the mechanical transmission screw rod.

* * * * *